US012611805B2

(12) United States Patent
Chen et al.

(10) Patent No.: US 12,611,805 B2
(45) Date of Patent: Apr. 28, 2026

(54) METHOD OF MANUFACTURING MULTICOLOR-FOAMED SHOE BODY BY SUPERCRITICAL FOAMING AND MULTICOLOR-FOAMED SHOE BODY THEREOF

(71) Applicant: GLORY STEEL ENTERPRISE CO., LTD., Taichung City (TW)

(72) Inventors: Yi-Liang Chen, Taichung City (TW); Pao-Hsin Wang, Taichung City (TW)

(73) Assignee: GLORY STEEL ENTERPRISE CO., LTD., Taichung City (TW)

( * ) Notice: Subject to any disclaimer, the term of this patent is extended or adjusted under 35 U.S.C. 154(b) by 404 days.

(21) Appl. No.: 18/119,757

(22) Filed: Mar. 9, 2023

(65) Prior Publication Data

US 2024/0066767 A1 Feb. 29, 2024

(30) Foreign Application Priority Data

Aug. 30, 2022 (TW) .................................. 111132658

(51) Int. Cl.
*B29C 44/04* (2006.01)
*B29C 44/08* (2006.01)
(Continued)

(52) U.S. Cl.
CPC .......... *B29C 44/0453* (2013.01); *B29C 44/08* (2013.01); *B29C 44/3415* (2013.01);
(Continued)

(58) Field of Classification Search
CPC .......... A43B 1/0027; A43B 1/14; A43B 1/04; A43B 13/04; A43B 3/36; A43B 3/38;
(Continued)

(56) References Cited

U.S. PATENT DOCUMENTS

2015/0143723 A1* 5/2015 Tateishi ................. A43B 13/04
521/149
2017/0203529 A1* 7/2017 Wu ........................ B29D 35/02
(Continued)

FOREIGN PATENT DOCUMENTS

CN 103817964 A 5/2014
CN 109109353 A 1/2019
(Continued)

OTHER PUBLICATIONS

Machine English translation of Guo Zhi-Xiong (TW-I640260-B) (Year: 2018).*
(Continued)

*Primary Examiner* — Jeffrey M Wollschlager
*Assistant Examiner* — Edgaredmanuel Troche
(74) *Attorney, Agent, or Firm* — Apex Juris, pllc; R. Lynette Wylie

(57) ABSTRACT

A method of manufacturing a multicolor-foamed shoe body by supercritical foaming includes step S1 to step S3: step S1: provide a plurality of cold shot model molds and inject a plurality of foaming materials in different colors into a cavity of each of the cold shot model molds to form a plurality of cold shot models in different colors that is unfoamed; step S2: place the cold shot models in a hot-pressing mold for hot pressing to make a contacting surface of any two of the cold shot models that are adjacent engage with each other due to heating to foam a semi-finished product; and step S3: place the semi-finished product in a supercritical foaming autoclave for foam molding to obtain the multicolor-foamed shoe body. Additionally, the multicolor-foamed shoe body manufactured by the method is also disclosed in the present invention.

9 Claims, 10 Drawing Sheets

(51) Int. Cl.

| | |
|---|---|
| *B29C 44/34* | (2006.01) |
| *B29C 44/42* | (2006.01) |
| *B29L 31/50* | (2006.01) |
| *A43D 9/00* | (2006.01) |
| *A43D 25/06* | (2006.01) |
| *A43D 35/00* | (2006.01) |
| *A43D 63/00* | (2006.01) |
| *A43D 86/00* | (2006.01) |

(52) U.S. Cl.
CPC ................. *B29C 44/42* (2013.01); *A43D 9/00* (2013.01); *A43D 25/06* (2013.01); *A43D 35/00* (2013.01); *A43D 63/00* (2013.01); *A43D 86/00* (2013.01); *A43D 2200/00* (2013.01); *B29K 2995/0021* (2013.01); *B29L 2031/50* (2013.01)

(58) Field of Classification Search
CPC ......... A43B 13/14; A43B 13/18; A43B 17/00; A43B 3/10; A43B 7/00; A43B 13/12; A43B 13/16; B29D 35/0009; B29D 35/12; B29D 35/00; B29D 35/0018; B29D 35/122; B29D 35/128; B29D 35/142; B29K 21/00; B29K 2021/003; B29K 2023/083; B29K 2105/04; C08L 75/04; C08K 3/04; C08K 5/30; C08K 5/40; A43D 95/06; A43D 9/00; A43D 25/06; A43D 35/00; A43D 63/00; A43D 86/00; A43D 2200/00; A43D 999/00; C08J 9/12; C08J 9/228; C08J 9/00; C08J 9/18; C08J 9/232; B29C 44/34; B29C 43/20; B29C 43/52; B29C 44/04; B29C 44/06; B29C 44/08; B29C 44/42
USPC .......................................... 249/63
See application file for complete search history.

(56) References Cited

U.S. PATENT DOCUMENTS

| | | | | |
|---|---|---|---|---|
| 2020/0281314 A1* | 9/2020 | Stockbridge | ......... | B29D 35/128 |
| 2021/0114324 A1 | 4/2021 | Liu et al. | | |

FOREIGN PATENT DOCUMENTS

| | | | | | |
|---|---|---|---|---|---|
| CN | 109517264 A | | 3/2019 | | |
| CN | 112873937 A | * | 6/2021 | .......... | B29D 35/122 |
| CN | 114573858 A | | 6/2022 | | |
| CN | 114801008 A | | 7/2022 | | |
| KR | 20040010799 A | | 1/2004 | | |
| TW | I614111 B | | 2/2018 | | |
| TW | I640260 B | * | 11/2018 | | |

OTHER PUBLICATIONS

Machine English translation of Liu et al. (CN-112873937-A) (Year: 2021).*
Search Report for TW111132658, Issued on Feb. 2, 2023, Total of 1 page.
Translation of Abstract of CN114801008, Total of 1 page.
Translation of Abstract of CN109109353, Total of 1 page.
Translation of Abstract of CN112873937, Total of 1 page.
Translation of Abstract of CN103817964, Total of 1 page.
Translation of Abstract of KR20040010799, Total of 1 page.
Translation of Abstract of CN109517264, Total of 1 page.
Translation of Abstract of TWI614111, Total of 1 page.
Translation of Abstract of CN114573858, Total of 1 page.
Search Report for PCT/CN2022/115977, Issued on Dec. 19, 2022, Total of 2 pages.

* cited by examiner

Provide cold shot model molds and inject foaming materials in different colors into cavity of each of cold shot model molds to form cold shot models in different colors that are unfoamed

Place cold shot models in hot-pressing mold for hot pressing to make contacting surface of any two adjacent cold shot models engage with each other due to heating to form semi-finished product Place semi-finished product in supercritical foaming autoclave for foam molding to obtain multicolor foamed shoe body

METHOD OF MANUFACTURING MULTICOLOR-FOAMED SHOE BODY BY SUPERCRITICAL FOAMING AND MULTICOLOR-FOAMED SHOE BODY THEREOF

BACKGROUND OF THE INVENTION

Technical Field

The present invention relates generally to a technique of manufacturing a shoe material, and more particularly to a method of manufacturing a multicolor-foamed shoe body by supercritical foaming and the multicolor-foamed shoe body.

Description of Related Art

Shoe material developers focus on a shoe material that is colorful and multifunctional in recent years, allowing customers to select a multicolor shoe material based on their shoe style and preference.

However, with a conventional method of manufacturing the multicolor shoe body, two shoe components are adhered manually. As the aforementioned adhering process has to carry out a complicated surface treatment with chemical primer before spreading an adhesive on a surface of the two shoe components for adhering and then heat the two shoe components in a conveyor oven to speed up the surface treatment of the chemical primer for ensuring an adhesive strength, the conventional method of manufacturing the multicolor shoe body requires a massive labor cost. Besides, the chemical primer used in the surface treatment is toxic and causes dangers to the health of workers upon prolonged exposure, and the conveyor oven causes a massive carbon dioxide emission during generating heat energy and thereby causing environmental pollution.

There are a few techniques for rectifying the defects of the conventional method of manufacturing the multicolor shoe body. For example, the China invention patent No. CN112662043A discloses a foamed shoe material with impact protection, wherein a method of manufacturing the foamed shoe material with impact protection includes following steps: injection step: a cold shot model is molded by putting plastic granules into an injection machine; foaming step: the molded cold shot model is placed in a supercritical foaming autoclave for physical foaming; molding step: a semi-finished product that is foamed is left for cooling and is disposed in a flat pressing mold for pressing to form the foamed shoe material.

The method disclosed in the aforementioned patent is to carry out supercritical foaming and then hot-pressing molding on the cold shot model to form the foamed shoe material. However, as a foaming material in the cold shot model undergoes supercritical foaming in advance, foamed waste generated during the pressing process of the semi-finished product that is foamed in the molding step is not reusable. Massive amount of foamed waste generated by the massive and daily production of the shoe material causes environmental pollution problems and thereby a huge burden to the environment.

Therefore, the conventional method of manufacturing single color & multicolor-foamed shoe body still has room for improvement.

BRIEF SUMMARY OF THE INVENTION

In view of the above, the primary objective of the present invention is to provide a method of manufacturing a multicolor-foamed shoe body by supercritical foaming and the multicolor-foamed shoe body, wherein a plurality of cold shot models in different colors are engaged with one another through hot pressing to form a semi-finished product, and then the multicolor-foamed shoe body is obtained from the semi-finished product through supercritical foaming. The method could not only save costs of spreading an adhesive manually in the conventional method but also provide an environmentally friendly processing environment. Besides, the multicolor-foamed shoe body manufactured does not require additional processing and thereby does not cause waste, fulfilling the objective of sustainability development in Environmental Social Governance and increasing the yield.

The present invention provides a method of manufacturing a multicolor-foamed shoe body by supercritical foaming including following steps: step S1: provide a plurality of cold shot model molds and inject a plurality of foaming materials in different colors into a cavity of each of the cold shot model molds to form a plurality of cold shot models in different colors that is unfoamed; step S2: place the cold shot models in a hot-pressing mold for hot pressing to make a contacting surface of any two cold shot models that are adjacent engage with each other due to heating to foam a semi-finished product; and step S3: place the semi-finished product in a supercritical foaming autoclave for foam molding to obtain the multicolor-foamed shoe body.

The present invention further provides a multicolor-foamed shoe body made of a semi-finished product through supercritical foaming, wherein the semi-finished product is formed by engaging a plurality of cold shot models in different colors with one another through hot pressing. The multicolor-foamed shoe body includes a first foamed shoe component and a second foamed shoe component. The first foamed shoe component has a first engaging surface and the second foamed shoe component has a second engaging surface, wherein the second engaging surface and the first engaging surface are engaged with each other to be a monolithic unit.

With the aforementioned design, the method of manufacturing multicolor-foamed shoe body by supercritical foaming of the present invention is to firstly engage the cold shot models in different colors with one another through hot pressing. When the cold shot models are heated in the hot-pressing mold, pyrolysis in the molecular structure of each of the cold shot models occurs due to heating to engage the two adjacent cold shot models with each other to be a monolithic unit through crosslinking to form the semi-finished product. Then the multicolor-foamed shoe body is obtained from the semi-finished product via supercritical foaming. Therefore, the method could not only save costs of spreading an adhesive manually in the conventional method but also provide an environmentally friendly processing environment. Besides, the multicolor-foamed shoe body manufactured does not require additional processing and thereby does not cause waste, fulfilling the objective of sustainability development in Environmental Social Governance and increasing the yield.

Moreover, the multicolor-foamed shoe body in two or more colors could be manufactured by the method, increasing a variety of the colors of the multicolor-foamed shoe body and providing the multicolor-foamed shoe body a better appearance. Additionally, as the multicolor-foamed shoe body could have different physical properties, the multicolor-foamed shoe body manufactured by the method could be multifunctional upon the required demand.

BRIEF DESCRIPTION OF THE SEVERAL VIEWS OF THE DRAWINGS

The present invention will be best understood by referring to the following detailed description of some illustrative embodiments in conjunction with the accompanying drawings, in which FIG. 1 is flowchart of the method of manufacturing the multicolor-foamed shoe body by supercritical foaming according to an embodiment of the present invention;

DETAILED DESCRIPTION OF THE INVENTION

A method of manufacturing a multicolor-foamed shoe body by supercritical foaming of the present invention is illustrated in FIG. 1 and includes following steps:

Step S1: a plurality of cold shot model molds (not shown) is provided and a plurality of foaming materials in different colors is injected into a cavity of each of the cold shot model molds, wherein the foaming materials include rubber and plastic. When each of the foaming materials is solidified, the foaming materials are demolded from each of the cold shot model molds to form a plurality of cold shot models 10 in different colors that is unfoamed. More specifically, in the current embodiment, the cold shot models 10 are made of the same foaming material through injection molding, wherein the foaming materials are selected from a group including ethylene-vinyl acetate (EVA), synthetic rubber, polyurethane (PU), thermoplastic polyurethane (TPU), polyether block amide (PEBAX), thermoplastic vulcanizate (TPV), thermoplastic polyester elastomer (TPEE), thermoplastic polyamide elastomer (TPAE), polyolefin elastomer (POE), polypropene (PP), polyethylene (PE), acrylonitrile butadiene styrene (ABS), styrene-butadiene rubber (SBR), polyethylene terephthalate (PET), or thermoplastic elastomer (TPE). In an embodiment, the foaming materials could be selected from a group including ethylene-vinyl acetate (EVA), thermoplastic polyurethane (TPU), and thermoplastic elastomer (TPE).

In practice, referring to step S1, each of the foaming materials is injected under a condition that a screw temperature is controlled lower than 200 degrees Celsius, wherein

Figure 2:
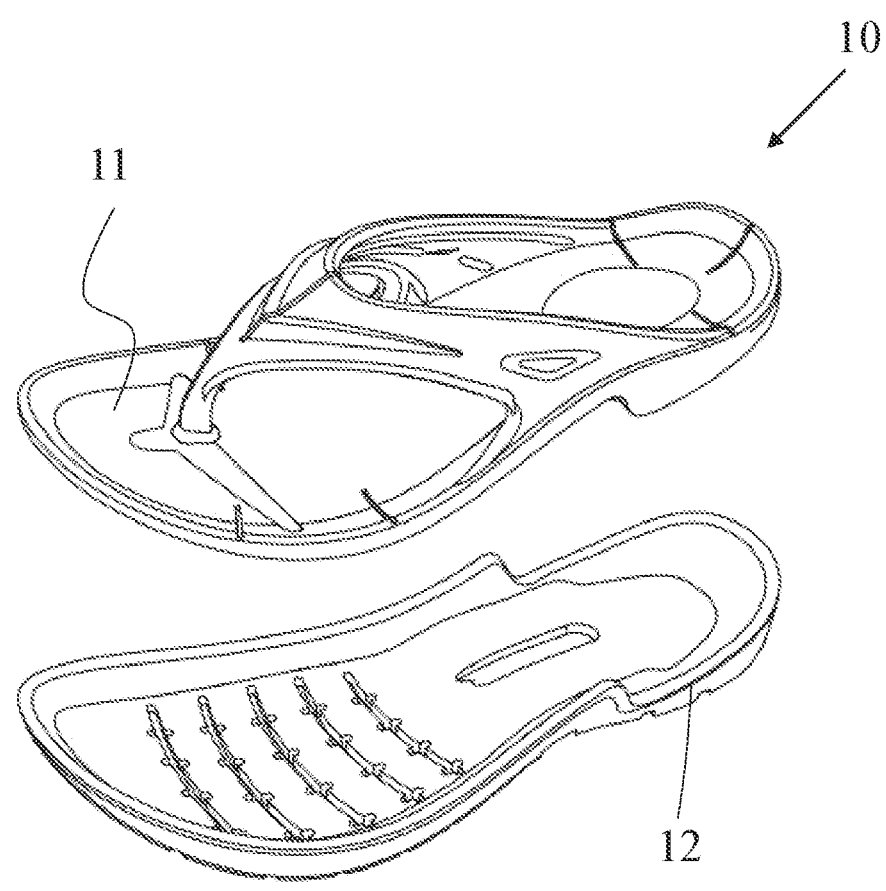
FIG. 2 is an exploded view of the cold shot model according to a first embodiment of the present invention.

4 the screw temperature means a temperature of the screw in the injection molding machine; when the screw temperature is higher than 200 degrees Celsius, foaming might not be completed in subsequent supercritical foaming process. The foaming materials injected could be evenly distributed in the cavity of one of the cold shot model molds (not shown) to form one of the cold shot models 10 through adjusting the injection pressure during injection. The cold shot models 10 could be a shoe upper cold shot model, a shoe sole cold shot model, a footbed cold shot model, a sole pattern cold shot model, and a shoe body cold shot model, etc. Referring to FIG. 2, in a first embodiment, the cold shot models 10 include a shoe upper cold shot model 11 and a shoe sole cold shot model 12 as an example.

The cold shot models 10 of the present invention are unfoamed and could have the same color and the same physical property or different colors and different physical properties based on the required demand. In the current embodiment, a difference between hardnesses of the cold shot models 10 is less than or equal to 40 degrees, wherein the hardness is measured by a Shore D durometer. In the present invention, the hardness of any object is measured the Shore D durometer. For example, a hardness of the shoe sole cold shot model 12 is greater than a hardness of the shoe upper cold shot model 11, making a multicolor-foamed shoe body 30 that is foamed multifunctional and thereby allowing a user to wear comfortably and walk stably.

Figure 3:
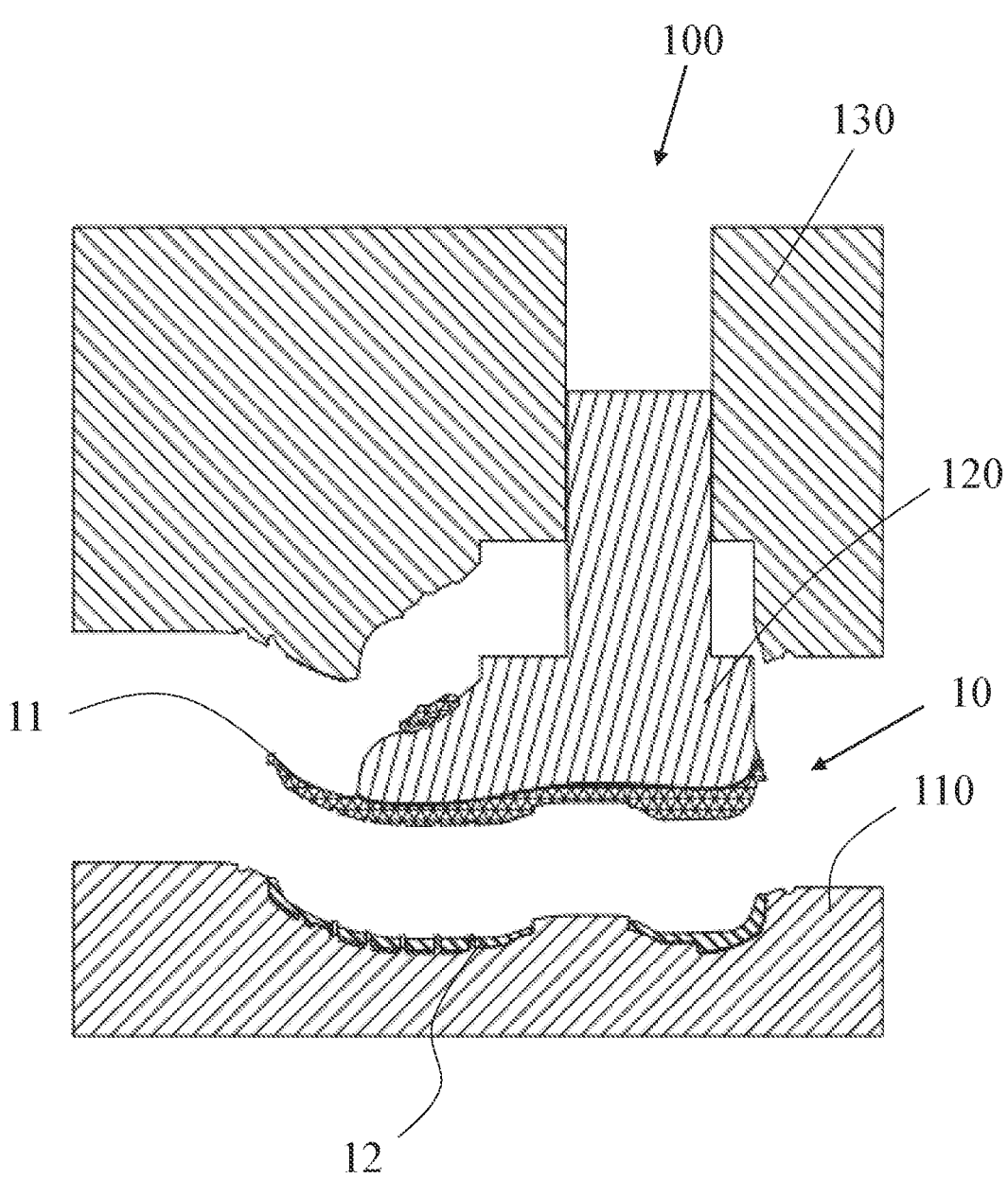
FIG. 3 is a sectional schematic view, showing the cold shot model according to the first embodiment of the present invention is disposed in the hot-pressing mold.
Figure 4:
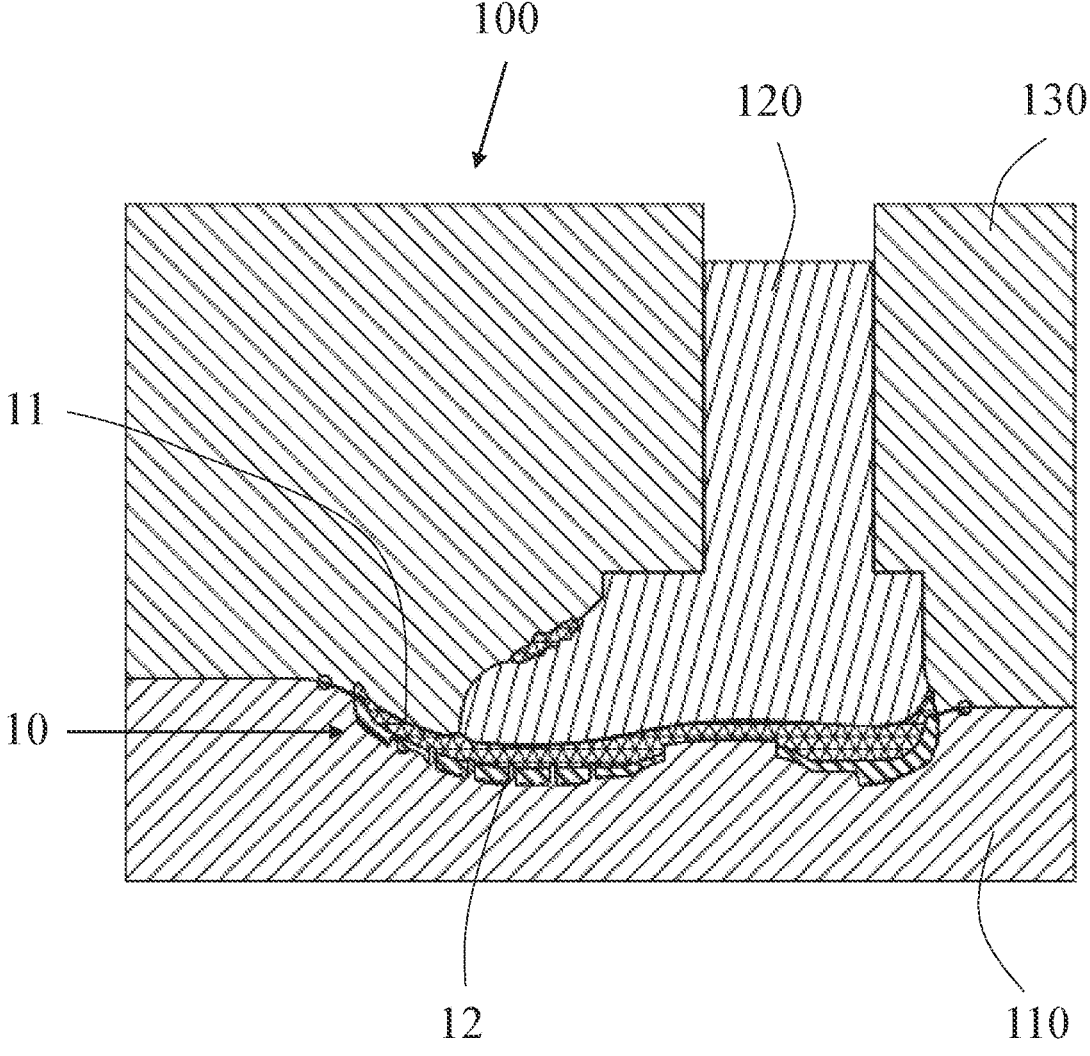
FIG. 4 is a sectional schematic view, showing the hot-pressing mold according to the first embodiment of the present invention performs hot pressing.

Step S2: the cold shot models 10 are placed in a hot-pressing mold 100 for hot pressing to make a contacting surface of any two of the cold shot models 10 that are adjacent engage with each other due to heating to form a semi-finished product. More specifically, referring to FIG. 2 to FIG. 4, during a hot-pressing process, the shoe sole cold shot model 12 is placed in a lower mold 110 of the hot-pressing mold 100 and the shoe upper cold shot model 11 is disposed on an internal core 120 of the hot-pressing mold 100 at first; when the hot-pressing mold 100 is clamped, an upper mold 130 of the hot-pressing mold 100 drives the internal core 120 to clamp towards the lower mold 110, making a bottom surface of the shoe upper cold shot model 11 be in contact with a top surface of the shoe sole cold shot model 12 and making the shoe upper cold shot model 11 and the shoe sole cold shot model 12 be received in the cavity formed between the internal core 120, the upper mold 130, and the lower mold 110.

During the hot-pressing process, the shoe upper cold shot model 11 and the shoe sole cold shot model 12 are made of the same foaming material for injection molding. In the current embodiment, the foaming material is made of ethylene-vinyl acetate (EVA) as an example. Therefore, the shoe upper cold shot model 11 and the shoe sole cold shot model 12 are heated in the cavity to allow pyrolysis in a molecular structure of both the shoe upper cold shot model 11 and the shoe sole cold shot model 12 to occur due to heating and allow crosslinking between the shoe upper cold shot model 11 and the shoe sole cold shot model 12 that are adjacent to occur, thereby the bottom surface of the shoe upper cold shot model 11 and the top surface of the shoe sole cold shot model 12 are engaged with each other to be a monolithic unit to form the semi-finished product (not shown) that is in two colors. In other embodiments, the cold shot models 10 could be made of different foaming materials, but it is noted that the engaging effect of the cold shot models 10 through hot pressing might be affected (e.g. the engaging effect of the cold shot models 10 through hot pressing might be weakened).

Additionally, in the current embodiment, a temperature of the hot-pressing mold 100 ranges between 130 degrees Celsius and 180 degrees Celsius and a time of hot pressing ranges between 10 seconds and 800 seconds, but not limited thereto. Conditions of the hot-pressing mold 100 could be adjusted based on properties of the foaming materials, as long as the temperature of the hot-pressing mold 100 and the time of hot pressing could reach a softening temperature of the foaming materials in each of the cold shot models 10.

Step S3: the semi-finished product is placed in a super-critical foaming autoclave (not shown) for foam molding to obtain the multicolor-foamed shoe body 30, wherein the supercritical foaming autoclave is filled with a supercritical fluid. When the semi-finished product is placed in the supercritical foaming autoclave, the supercritical foaming autoclave is heated and pressurized for a period of time to make the supercritical foaming fluid infiltrate into the semi-finished product. Afterwards, the supercritical foaming auto-clave is depressurized to allow physical foaming to occur in the semi-finished product to form the multicolor-foamed shoe body 30. More specifically, during a supercritical foaming process of the semi-finished product, as foaming ratios of the cold shot models 10 are different, the semi-finished product foams to form a foamed intermediate (not shown) that is in a bent state, and the multicolor-foamed shoe body 30 is formed when the foamed intermediate is cooled and remolded. In other embodiments, if a foaming ratio of each of the cold shot models 10 in the semi-finished product is the same, the semi-finished product could form the multicolor-foamed shoe body 30 at once after supercriti-cal foaming without forming the foamed intermediate.

Figure 5:
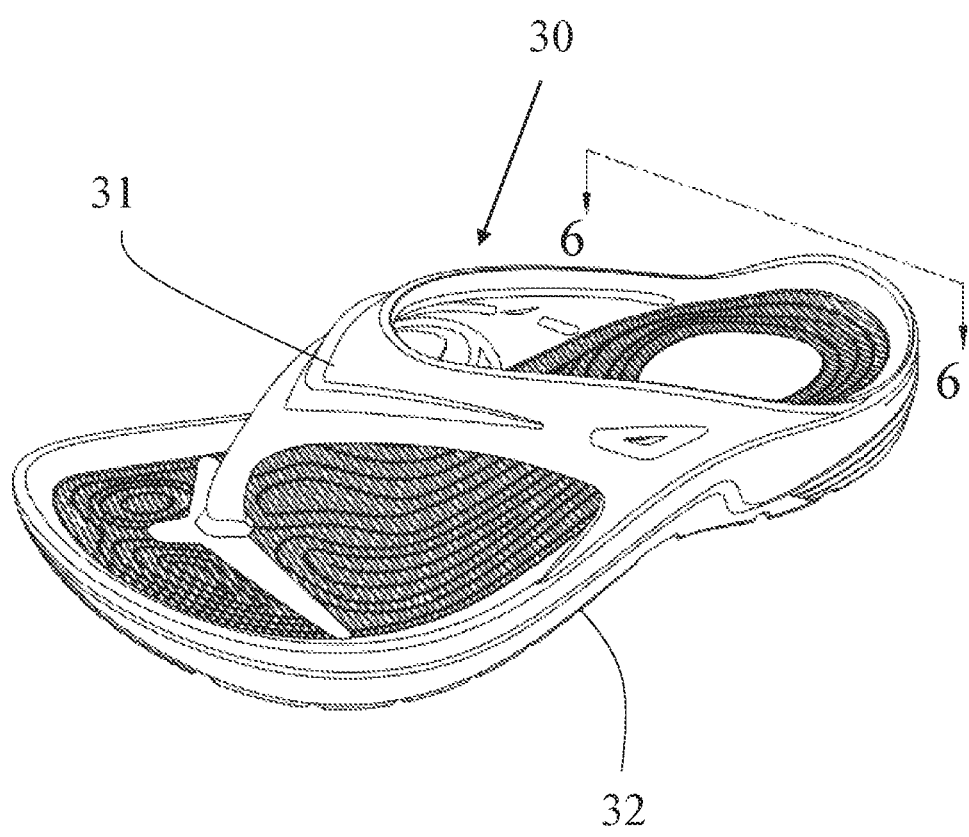
FIG. 5 is a perspective view of the multicolor-foamed shoe body according to the first embodiment of the present invention.
Figure 6:
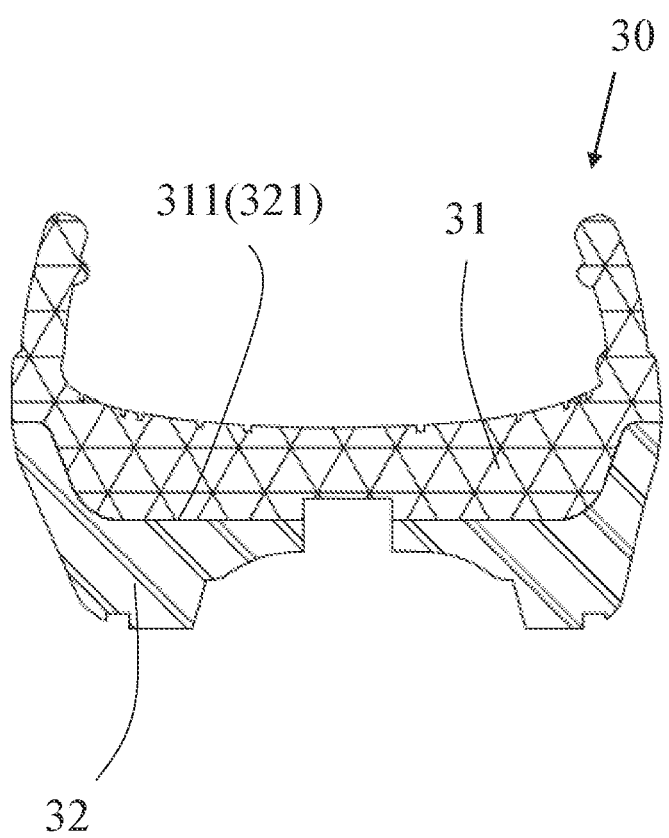
FIG. 6 is a sectional view along the 6-6 line in FIG. 5.
Figure 7:
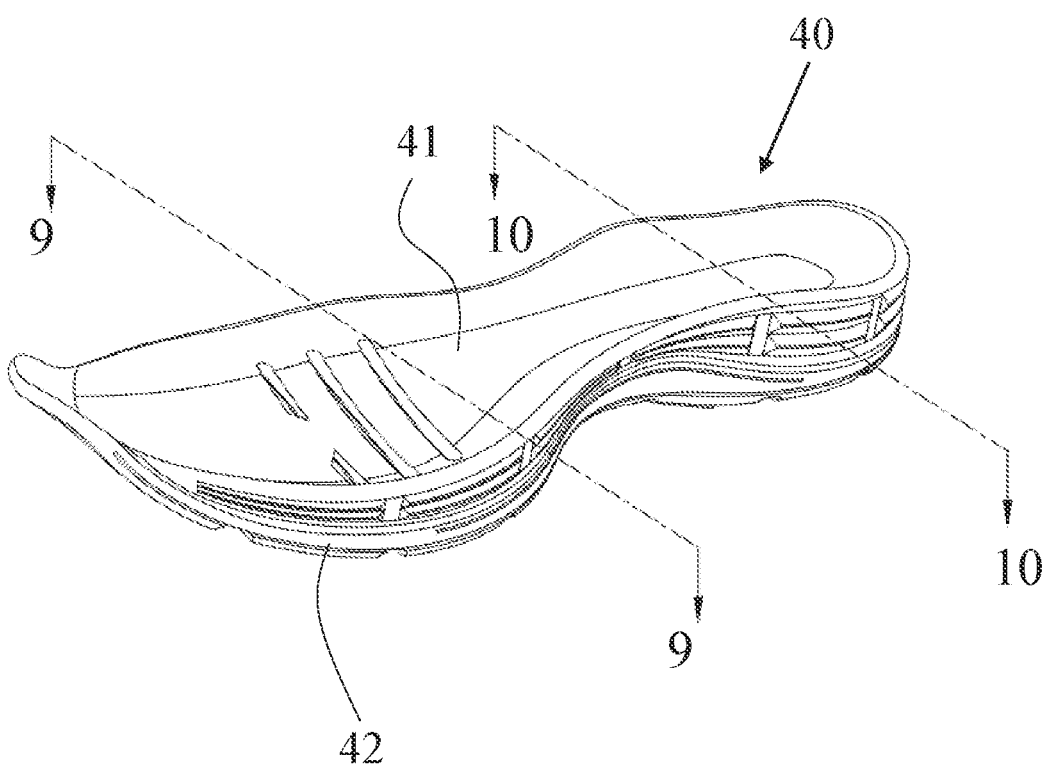
FIG. 7 is a perspective view of the multicolor-foamed shoe body according to a second embodiment of the present invention.

The multicolor-foamed shoe body 30 according to the first embodiment of the present invention is illustrated in FIG. 5 to FIG. 6 and is manufactured by the method according to the aforementioned embodiment through supercritical foam-ing of the semi-finished product, wherein the cold shot models 10 in different colors are engaged with one another through hot pressing to form the semi-finished product. The multicolor-foamed shoe body 30 could be selected from a group including an outsole, a sandal, a slipper, and a pump. Referring to FIG. 5, the multicolor-foamed shoe body 30 according to the first embodiment of the present invention is a sandal in two colors as an example and includes a first foamed shoe component 31 and a second foamed shoe component 32, wherein the first foamed shoe component 31 is a shoe upper of the multicolor-foamed shoe body 30, and the second foamed shoe component 32 is a shoe sole of the multicolor-foamed shoe body 30. A bottom of the first foamed shoe component 31 has a first engaging surface 311, and a top of the second foamed shoe component 32 has a second engaging surface 321, wherein the second engaging surface 321 and the first engaging surface 311 are engaged with each other to be a monolithic unit (i.e., no conventional adhesive is used between the second engaging surface 321 and the first engaging surface 311). In other words, the first foamed shoe component 31 and the second foamed shoe component 32 of the multicolor-foamed shoe body 30 are integrally engaged as a monolithic unit, and respectively and clearly show different colors as seen from an outer periph-erical surface of the multicolor-foamed shoe body 30. Addi-tionally, in the current embodiment, a difference between a hardness of the first foamed shoe component 31 and a hardness of the second foamed shoe component 32 of the multicolor-foamed shoe body 30 is less than 40 degrees, and the hardness of the second foamed shoe component 32 is larger than the hardness of the first foamed shoe component 31. As the shoe upper is made of a particularly soft material to be soft and elastic, and the shoe sole contacting with the ground is made of a particularly hard material to be anti-slipping and wear-resistant, a user could walk more com-fortably and stably.

Figure 8:
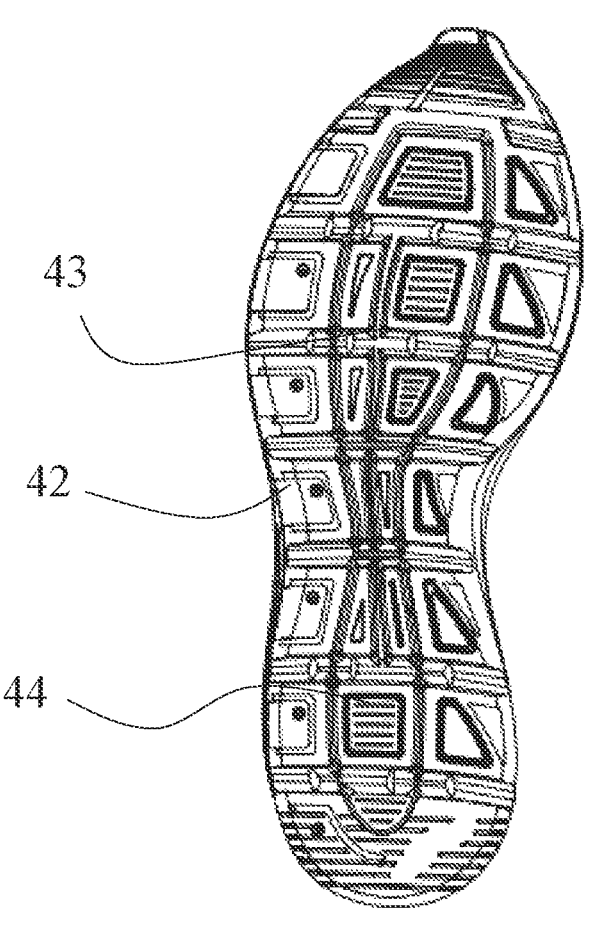
FIG. 8 is a bottom view of the multicolor-foamed shoe body according to the second embodiment of the present invention.

A multicolor-foamed shoe body 40 according to a second embodiment of the present invention is illustrated in FIG. 7 to FIG. 10 and is a sneaker outsole in four colors, and is manufactured from a semi-finished product through super-critical foaming as well. In the second embodiment, the semi-finished product is formed by engaging the cold shot models 10 (not shown) in four different colors with one another through hot pressing, wherein the cold shot models 10 includes a footbed cold shot model, a shoe sole cold shot model, and two sole pattern cold shot models. A method of manufacturing the multicolor-foamed shoe body 40 is the same as the method of manufacturing the multicolor-foamed shoe body by supercritical foaming according to the afore-mentioned embodiment, thus we are not going to describe in details herein. As shown in FIG. 7 to FIG. 10, the multicolor-foamed shoe body 40 includes a first foamed shoe compo-nent 41, a second foamed shoe component 42, a third foamed shoe component 43, and a fourth foamed shoe component 44, wherein the first foamed shoe component 41 is a footbed of the multicolor-foamed shoe body 40, and the second foamed shoe component 42 is a shoe sole of the multicolor-foamed shoe body 40, and the third foamed shoe component 43 and the fourth foamed shoe component 44 are respectively a sole pattern of the multicolor-foamed shoe body 40. The third foamed shoe component 43 and the fourth foamed shoe component 44 are respectively engaged with a bottom of the second foamed shoe component 42 and are adjacent to each other (as shown in FIG. 8).

Figure 9:
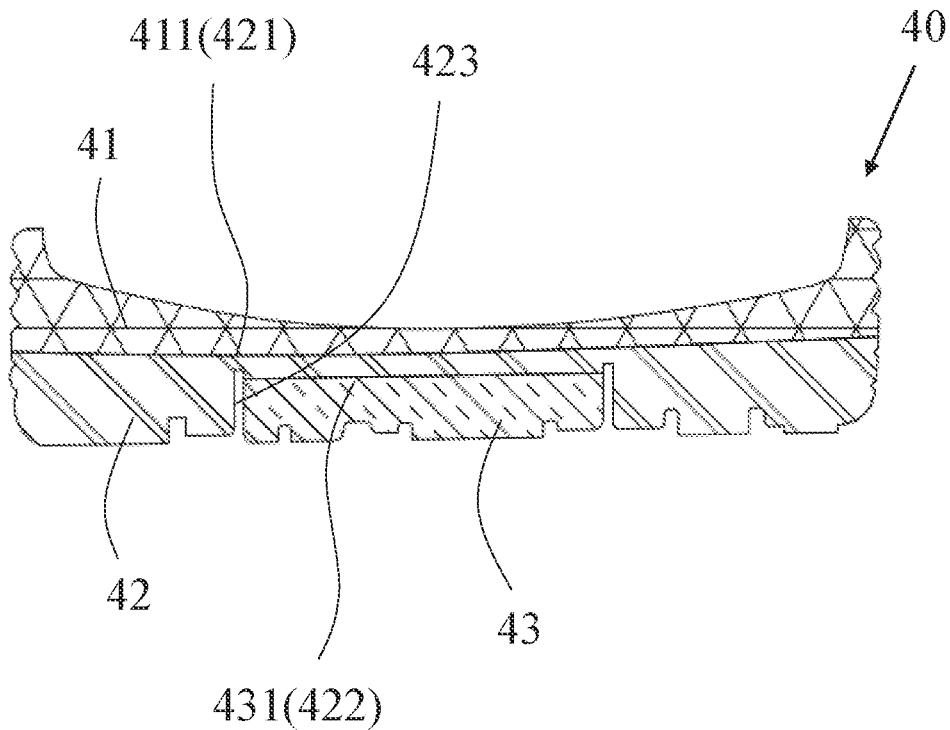
FIG. 9 is a sectional view along the 9-9 line in FIG. 7.
Figure 10:
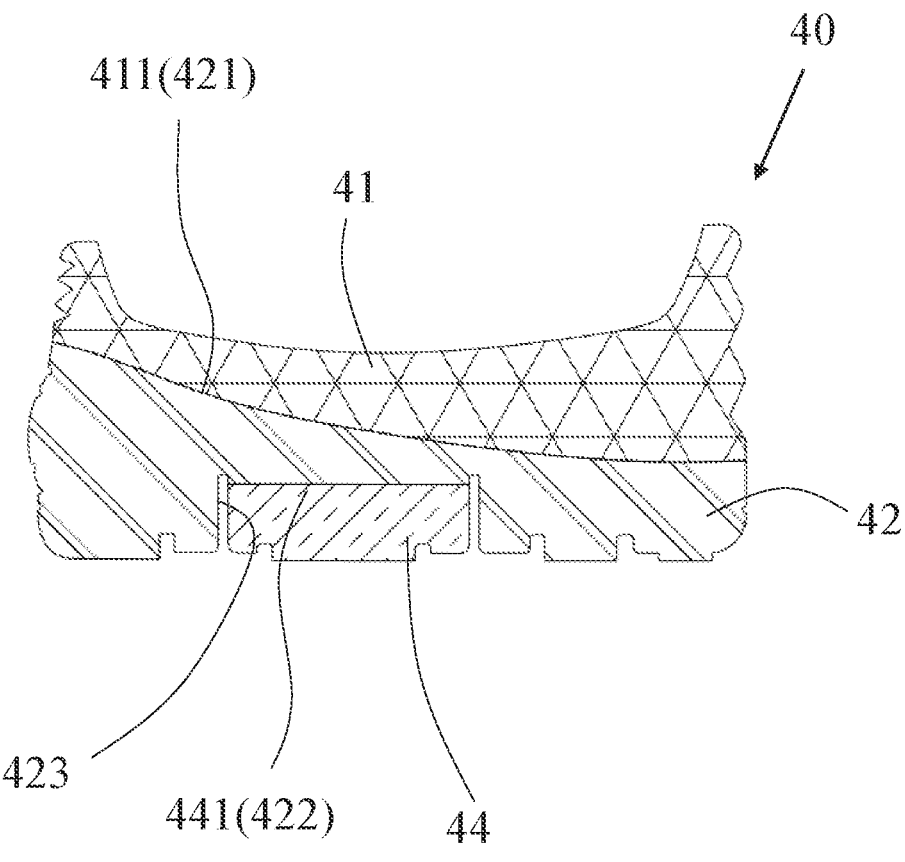
FIG. 10 is a sectional view along the 10-10 line in FIG. 7.

As shown in FIG. 9 and FIG. 10, a bottom of the first foamed shoe component 41 has a first engaging surface 411, and a top of the second foamed shoe component 42 has a second engaging surface 421, wherein the second engaging surface 421 and the first engaging surface 411 are engaged with each other to be a monolithic unit, making the first foamed shoe component 41 engage with the top of the second foamed shoe component 42. A top of the third foamed shoe component 43 has a third engaging surface 431, and a top of the fourth foamed shoe component 44 has a fourth engaging surface 441. A bottom of the second foamed shoe component 42 has a receiving groove 423, wherein a bottom of the receiving groove 423 has a fifth engaging surface 422. The third foamed shoe component 43 and the fourth foamed shoe component 44 are respectively disposed in the receiving groove 423, and the third engaging surface 431 and the fourth engaging surface 441 are respec-tively engaged with the fifth engaging surface 422 to be a monolithic unit, so that the first foamed shoe component 41, the second foamed shoe component 42, the third foamed shoe component 43, and the first foamed shoe component 44 of the multicolor-foamed shoe body 40 are engaged with one another to be a monolithic unit. In this way, the multicolor-foamed shoe body 40 is an outsole showing four colors evenly. The colors of the multicolor-foamed shoe body 40 are various and make the multicolor-foamed shoe body 40 more beautiful. The multicolor-foamed shoe body 40 could be designed as multifunctional and large in density upon the required demand. In other embodiments, either the fourth foamed shoe component 44 or the third foamed shoe com-ponent 43 could be omitted, and the multicolor-foamed shoe body 40 could be designed as a sneaker outsole in three colors; or both the third foamed shoe component 43 and the fourth foamed shoe component 44 could be omitted, as long as the multicolor-foamed shoe body 40 are in at least two colors.

With the aforementioned design, the method of manufacturing multicolor-foamed shoe body by supercritical foaming of the present invention is to firstly engages the cold shot models 10 in different colors with one another through hot pressing. As the cold shot models 10 are made of the same foaming material, pyrolysis in the molecular structure of each of the cold shot models 10 occurs due to heating when the cold shot models 10 are heated in the hot-pressing mold 100, making any two adjacent cold shot models 10 engage with each other as a monolithic unit through crosslinking to form the semi-finished product. Then the multicolor-foamed shoe body 30, 40 are obtained from the semi-finished product via supercritical foaming.

In this way, the method of manufacturing the multicolor-foamed shoe body in the embodiment could save costs of spreading an adhesive manually in a conventional method. Besides, as waste generated during the hot pressing of the cold shot models 10 in Step S2 is unfoamed, the waste could be recycled to produce the foaming material, effectively reducing unrecyclable waste generated by the method of manufacturing multicolor-foamed shoe body by supercritical foaming and providing an environmentally friendly processing environment. Additionally, the multicolor-foamed shoe body 30, 40 manufactured do not require additional processing and thereby do not cause waste, fulfilling the objective of sustainability development in Environmental Social Governance and increasing the yield.

Moreover, the multicolor-foamed shoe body 30, 40 is molded at once through physical foaming, wherein any two adjacent foamed shoe components are firmly engaged with each other through crosslinking without using any chemical agents, making the multicolor-foamed shoe body 30, 40 recyclable and environmentally friendly. In addition, in the second embodiment, the multicolor-foamed shoe body 40 could be manufactured as a shoe material in three or four colors which increases a variety of the colors of the multicolor-foamed shoe body 40 and provides the multicolor-foamed shoe body 40 a better appearance, and could have different physical properties, making the shoe body beautiful, comfortable, and multifunctional.

It must be pointed out that the embodiments described above are only some preferred embodiments of the present invention. All equivalent structures and method which employ the concepts disclosed in this specification and the appended claims should fall within the scope of the present invention.

What is claimed is:

1. A method of manufacturing a multicolor-foamed shoe body by supercritical foaming in an injection molding machine, comprising following steps:

step S1: providing a plurality of cold shot model molds and injecting a plurality of foaming materials in different colors into a cavity of each of the plurality of cold shot model molds to form a plurality of cold shot models in different colors that is unfoamed, wherein each of the plurality of foaming materials is injected under a condition that a screw temperature is controlled lower than 200 degrees Celsius and the screw temperature means a temperature of the screw in the injection molding machine;

step S2: placing the plurality of cold shot models in a hot-pressing mold for hot pressing to make a contacting surface of any two of the plurality of cold shot models that are adjacent engage with each other due to heating to form a semi-finished product, wherein the plurality of cold shot models comprises a shoe upper cold shot model and a shoe sole cold shot model, and the shoe upper cold shot model and the shoe sole cold shot model are made of the same foaming material; the shoe sole cold shot model is placed in a lower mold of the hot-pressing mold, and the shoe upper cold shot model is disposed on an internal core of the hot-pressing mold; when the hot-pressing mold is clamped, an upper mold of the hot-pressing mold drives the internal core to clamp towards the lower mold, making a bottom surface of the shoe upper cold shot model be in contact with a top surface of the shoe sole cold shot model and making the shoe upper cold shot model and the shoe sole cold shot model be received in the cavity formed between the internal core, the upper mold, and the lower mold, and the shoe upper cold shot model and the shoe sole cold shot model are assembled according to the cavity contour of the hot-pressing mold; and step S3: placing the semi-finished product in a supercritical foaming autoclave for foam molding to obtain the multicolor-foamed shoe body.

2. The method as claimed in claim 1, wherein in step S2, each of the plurality of cold shot models is made of the same foaming material through injection molding; during a process of hot pressing in the hot-pressing mold, the plurality of cold shot models are heated in the hot-pressing mold, allowing pyrolysis in a molecular structure of each of the plurality of cold shot models to occur due to heating and allowing crosslinking between any two of the plurality of cold shot models that are adjacent to occur, thereby the contacting surface of any two of the plurality of cold shot models that are adjacent is engaged with each other to be a monolithic unit to form the semi-finished product.

3. The method as claimed in claim 2, wherein in step S2, a temperature of the hot-pressing mold ranges between 130 degrees Celsius and 180 degrees Celsius and a time of hot pressing ranges between 10 seconds and 800 seconds.

4. The method as claimed in claim 2, wherein in step S2, the semi-finished product comprises a combination of a shoe upper cold shot model, a shoe sole cold shot model, a footbed cold shot model, a sole pattern cold shot model, and a shoe body cold shot model.

5. The method as claimed in claim 1, wherein in step S2, the semi-finished product comprises a combination of a shoe upper cold shot model, a shoe sole cold shot model, a footbed cold shot model, a sole pattern cold shot model, and a shoe body cold shot model.

6. The method as claimed in claim 1, wherein in step S1, the plurality of foaming materials are selected from a group comprising ethylene-vinyl acetate (EVA), synthetic rubber, polyurethane (PU), thermoplastic polyurethane (TPU), polyether block amide (PEBAX), thermoplastic vulcanizate (TPV), thermoplastic polyester elastomer (TPEE), thermoplastic polyamide elastomer (TPAE), polyolefin elastomer (POE), polypropene (PP), polyethylene (PE), acrylonitrile butadiene styrene (ABS), styrene-butadiene rubber (SBR), polyethylene terephthalate (PET), and thermoplastic elastomer (TPE).

7. The method as claimed in claim 1, wherein the plurality of foaming materials are selected from a group comprising ethylene-vinyl acetate (EVA), thermoplastic polyurethane (TPU), and thermoplastic elastomer (TPE).

8. The method as claimed in claim 1, wherein in step S1, a difference between hardnesses of the plurality of cold shot models is less than or equal to 40 degrees.

9. The method as claimed in claim 1, wherein in step S3, the supercritical foaming autoclave is filled with a supercritical fluid; when the semi-finished product is placed in the supercritical foaming autoclave, the supercritical foaming autoclave is heated and pressurized for a period of time to make the supercritical fluid infiltrate into the semi-finished product; afterwards, the supercritical foaming autoclave is depressurized to make the semi-finished product foam to form the multicolor-foamed shoe body.

\* \* \* \* \*